United States Patent
Lee et al.

(10) Patent No.: US 7,466,383 B2
(45) Date of Patent: Dec. 16, 2008

(54) LIQUID CRYSTAL DISPLAY DEVICE AND METHOD FOR FABRICATING THE SAME

(75) Inventors: Hyun Kyu Lee, Seoul (KR); Seung Chan Choi, Kyngsan-shi (KR)

(73) Assignee: LG Display Co., Ltd., Seoul (KR)

( * ) Notice: Subject to any disclaimer, the term of this patent is extended or adjusted under 35 U.S.C. 154(b) by 670 days.

(21) Appl. No.: 11/167,881

(22) Filed: Jun. 27, 2005

(65) Prior Publication Data

US 2006/0001809 A1    Jan. 5, 2006

(30) Foreign Application Priority Data

Jun. 30, 2004    (KR) .................. 10-2004-0050380

(51) Int. Cl.
 *G02F 1/1337*    (2006.01)
(52) U.S. Cl. .................. 349/128; 349/129; 349/141
(58) Field of Classification Search .................. None
See application file for complete search history.

(56) References Cited

U.S. PATENT DOCUMENTS

2002/0041354 A1*    4/2002    Noh et al. .................. 349/141

* cited by examiner

*Primary Examiner*—Richard H Kim
(74) *Attorney, Agent, or Firm*—Brinks Hofer Gilson & Lione

(57) ABSTRACT

A liquid crystal display and a method for fabricating the same are disclosed, which can yield maximum liquid crystal efficiency from all areas within the pixels by orienting the liquid crystals in a manner that the liquid crystals are twisted by 90° in an area above the electrodes and twisted by 180° in an area in-between the electrodes. The liquid crystal display device includes, a pixel electrode insulated from a counter electrode having a plurality of slits on a first substrate, a second substrate facing into and adhered to the first substrate and having a liquid crystal layer formed therebetween, and an orientation layer formed on each inner surface of the first substrate and the second substrate, wherein one orientation layer is oriented to be twisted by 90° from above the pixel electrode and the other orientation layer is oriented to be twisted by 180° from above the slit.

6 Claims, 6 Drawing Sheets

LIQUID CRYSTAL DISPLAY DEVICE AND METHOD FOR FABRICATING THE SAME

This application claims the benefit of the Korean Patent Application No. P2004-050380, filed on Jun. 30, 2004, which is hereby incorporated by reference as if fully set forth herein.

BACKGROUND OF THE INVENTION

1. Field of the Invention

The present invention relates to a liquid crystal display device, and more particularly, to a liquid crystal display device and a method for fabricating the same. Although the present invention is suitable for a wide scope of applications, it is particularly suitable for providing maximum liquid crystal efficiency from all areas of a pixel.

2. Discussion of the Related Art

Recently, as the capacity and performance of active liquid crystal display devices are developing and a fast rate, flat panel televisions, portable computers, monitors, and so on are being used extensively. Among the active liquid crystal display devices, twisted nematic (TN) liquid crystal display devices are most generally used. In the twisted nematic liquid crystal display device, an electrode is formed on each of two substrates. Herein, the electrodes are aligned so that liquid crystal directors are twisted to 90°. Then, voltage is applied to the electrodes so as to operate the liquid crystal director.

The twisted nematic liquid crystal display device is highly acknowledged for its excellent contrast and color representation. However, the twisted nematic liquid crystal display device is disadvantageous in that it has a very narrow viewing angle.

In order to overcome the problem of a narrow viewing angle of the twisted nematic liquid crystal display device, an in-plane switching (IPS) mode liquid crystal display device is used. In the IPS mode liquid crystal display device, two electrodes are formed on a single substrate so that a transverse electric field formed between the two electrodes can control the liquid crystal director.

Thereafter, a fringe field switching (FFS) mode liquid crystal display device has been proposed in order to enhance the low aperture ratio and transmissivity of the IPS mode liquid crystal display device. In the FFS mode liquid crystal display device, a counter electrode and a pixel electrode are formed of a transparent conductive material. And, the counter electrode and the pixel electrode are formed to be spaced apart at a close distance. A fringe field formed between the counter electrode and the pixel electrode operates the liquid crystal molecules.

Hereinafter, the FFS mode liquid crystal display device and the IPS mode liquid crystal display device of a thin film transistor (TFT) array panel will now be described in detail.

FIG. 1 illustrates a plane view of a related art IPS mode liquid crystal display device. And, FIG. 2 illustrates a cross-sectional view taken along line I-I' of FIG. 3. FIG. 3 illustrates a plane view of a related art FFS mode liquid crystal display device. And, FIG. 4 illustrates a cross-sectional view taken along line II-II' of FIG. 3.

Referring to FIG. 1 and FIG. 2, the IPS mode liquid crystal display device includes a gate line 12 and a data line 15, a thin film transistor, and a common electrode 24 and a pixel electrode 17. The gate line 12 and the data line 15 perpendicularly cross one another so as to define a unit pixel. The thin film transistor is formed at a crossing point (or intersection) between the gate line 12 and the data line 15. Then, the common electrode 24 and the pixel electrode 17 are alternately formed so as to be parallel to one another. Herein, a transverse electric field is generated between the common electrode 24 and the pixel electrode 17. At this point, the common electrode 24 and a common line 25 are formed as a single body, the common line 25 being parallel to the gate line 12. The common electrode 24 receives voltage from outside of the active area.

As described above, the common electrode 24 and the pixel electrode 17 are formed on the same substrate. Then, the voltage is applied between the two electrodes so as to generate a transverse electric field, which is parallel to the substrate. Thus, the transverse electric field can rotate the liquid crystal molecules, while the liquid crystal molecules remain parallel to the substrate. The IPS mode liquid crystal display device further includes an orientation layer, which is formed on the inner surface of each substrate. The orientation layer of the upper substrate and the orientation layer of the lower substrate are rubbed so that each orientation direction is parallel to one another.

Hereinafter, the method for fabricating the IPS mode liquid crystal display device will now be described in detail.

First of all, a gate material is deposited on a substrate 11 and patterned. Then, a plurality of gate lines 12, gate electrodes 12a, common lines 25, and common electrodes 24 are formed thereon. Subsequently, an insulating material is deposited on the entire surface including the gate lines 12 so as to form a gate insulating layer 13. Then, a layer of amorphous silicon (a-Si:H) is deposited on the gate insulating layer 13 at a high temperature and patterned, thereby forming a semiconductor layer 14 on the gate insulating layer 13 formed over the gate electrode 12a.

Thereafter, a low-resistance metal layer is deposited on the semiconductor layer 14, thereby forming a plurality of data lines 15, and source/drain electrodes 15a/15b. Then, a layer of inorganic insulating material or organic insulating material is deposited on the entire surface including the data lines 15, so as to form a protective layer 16. Afterwards, a portion of the protective layer 16 is removed so as to form a contact hole, which exposes the drain electrode 15b.

Finally, a layer of transparent conductive material, such as indium tin oxide (ITO) or indium zinc oxide (IZO), is deposited on the protective layer 16 and patterned, thereby forming the pixel electrode 17. The pixel electrode 17, which is parallel to the common electrode 24, passes through the contact hole and contacts the drain electrode 15b. Subsequently, an orientation layer (not shown) is formed on the pixel electrode 17, which is then oriented to a desired direction, thereby completing the IPS mode liquid crystal display device. Generally, the IPS mode liquid crystal display device maintains an orientation angle of 180° between the orientation layer of the upper substrate and the orientation layer of the lower substrate, regardless of whether the orientation is directed left-to-right or right-to-left.

However, the IPS mode liquid crystal display device shows a transmissivity dispersion as shown in FIG. 2. More specifically, in area ①, which is between the pixel electrode 17 and the common electrode 24, the liquid crystals 30 are tilted due to the transverse electric field, thereby showing high transmissivity. In area ②, which is above the pixel electrode 17 and the common electrode 24, a portion of the liquid crystals 30 is moved in a vertical direction, thereby causing a decrease in transmissivity and brightness.

On the other hand, referring to FIG. 3 and FIG. 4, the FFS mode liquid crystal display device includes a gate line 512 and a common line 525, a thin film transistor, and a plate-type counter electrode 524 and pixel electrode 517. The gate line 512 and common line 525 are each formed of opaque metal perpendicularly crossing one another, so as to define a pixel. The thin film transistor switches the voltage on/off at each intersection between the gate line 512 and common line 525. The plate-type counter electrode 524 and pixel electrode 517 are formed of transparent metal. The plate-type counter electrode 524 and pixel electrode 517 are insulated by an insulating layer and overlap one another within each pixel. At this point, the counter electrode 524 and the common line 525 contact one another. The common line 525 is fixed to be parallel to the gate line 512, thereby dividing the pixel to an upper portion and a lower portion.

More specifically, the pixel electrode 517 is formed of a transparent plate-type metal. A plurality of slits 560 is formed to be vertically symmetrical to one another along the axis of the common line 525. And, a fringe field is generated between the counter electrode 524 and the pixel electrode 517. At this point, a Vcom signal is transmitted to the counter electrode 524, and a pixel voltage, which passes through the thin film transistor, is transmitted to the pixel electrode 517.

Each of the slits 560 has a width within the range of 2 to 6 micrometers (μm). And, the liquid crystals are driven by the fringe field generated between the pixel electrode 517 and the counter electrode 524. In other words, when voltage is not applied, the initially oriented liquid crystals rotate due to the fringe field, thereby allowing light to pass through. The FFS mode liquid crystal display device further includes an orientation layer, which is formed on the inner surface of each of the upper and lower substrates. The orientation direction between the orientation layer of the upper substrate and the orientation layer of the lower substrate maintains 90°, which is identical to the general TN mode liquid crystal display device.

Hereinafter, the method for fabricating the FFS liquid crystal display device will now be described in detail. First of all, a transparent conductive material, such as ITO, is deposited on the substrate 511 and patterned, so as to form a counter electrode 524. A gate material is deposited on the counter electrode 524 and patterned, thereby forming the gate line 512 and the common line 525. A portion of the gate line 512 becomes the gate electrode. And, the gate line 512 and the common line 525 are parallel to one another.

Thereafter, an insulating material is deposited on the entire surface of the substrate having the counter electrode 524, the gate line 512, and the common line 525 formed thereon, thereby forming a gate insulating layer 513. Then, a semiconductor layer 514 is formed on a portion of the gate insulating layer 513 above the gate electrode. Subsequently, a data material is deposited on the entire surface of the structure including the semiconductor layer 514 and patterned, so as to form a data line 515, and source/drain electrodes 515a and 515b. Then, an insulating material is deposited on the entire surface of the structure including the data line 515, thereby forming a protective layer 516.

Finally, a transparent conductive material, such as ITO, is deposited on the protective layer 516 and patterned, so as to form the pixel electrode 517 having a plurality of slits 560. Then, an orientation layer (not shown) is formed, which is then oriented to a desired direction, thereby completing the FFS mode liquid crystal display device. Generally, the FFS mode liquid crystal display device maintains an orientation angle of 90° between the orientation layer of the upper substrate and the orientation layer of the lower substrate, regardless of the orientation direction.

However, the FFS mode liquid crystal display device shows a transmissivity dispersion as shown in FIG. 4. More specifically, in area ①, which is above the pixel electrode 517, the liquid crystals 530 are tilted, thereby showing high transmissivity. In area ②, which is above the edge portion of the pixel electrodes 517 and above the slits formed between the pixel electrodes 517, a portion of the liquid crystals 530 is moved in a vertical direction, thereby causing a decrease in transmissivity and luminance.

As described above, the related art liquid crystal display device has the following disadvantages.

The IPS mode liquid crystal display device, which is twisted by 180° and rubbed, may yield a maximum liquid crystal efficiency (0.8) in an area between the pixel electrode and the common electrode. However, the liquid crystal efficiency decreases noticeably (less than 0.4) in an area above the pixel electrode and the common electrode.

Conversely, the FFS mode liquid crystal display device, which is twisted by 90° as in the twisted nematic quid crystal display device and rubbed, yields a high liquid crystal efficiency (0.6 or more) above the electrodes. However, the liquid crystal efficiency decreases either in the edge portion of the pixel area or the slit area between the pixel electrodes.

SUMMARY OF THE INVENTION

Accordingly, the present invention is directed to a liquid crystal display device and a method for fabricating the same that substantially obviate one or more problems due to limitations and disadvantages of the related art.

The liquid crystal display device and a method for fabricating the same that can yield maximum liquid crystal efficiency from all areas within the pixels by orienting the liquid crystals in a manner that the liquid crystals are twisted by 90° in an area above the electrodes and twisted by 180° in an area in-between the electrodes.

A liquid crystal display device includes a gate line and a data line crossing one another on a first substrate, so as to define a pixel, a common line being substantially parallel to the gate line, a counter electrode contacting the common line and formed within the pixel, a pixel electrode insulated from the counter electrode and having a plurality of slits, and a second substrate facing into and adhered to the first substrate. The device has a liquid crystal layer positioned between the first substrate and the second substrate. The device also having a first orientation layer formed on the first substrate and a second orientation layer formed on the second substrate, wherein either the first or second orientation layer is oriented to be twisted by approximately 90° above the pixel electrode and the other orientation layer is oriented to be twisted by approximately 180° above the slit.

A method for fabricating a liquid crystal display device is disclosed that includes fabricating a counter electrode, a common line, and a gate line on a first substrate, covering the gate line with a gate insulating layer, placing a data line that crosses the gate line on the gate insulating layer, covering the data line with a protective layer, placing a pixel electrode having a plurality of slits on the protective layer, covering the pixel electrode with a first orientation layer, and orienting a first pixel electrode area of the first orientation layer to a first direction and a first slit area of the first orientation layer to a second direction. The method may further include forming a second orientation layer on a second substrate facing into the first substrate and orienting a second pixel electrode area of the second orientation layer to form an angle of approximately 90° with the first direction and a second slit area of the second orientation layer to form an angle of approximately 180° with the second direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
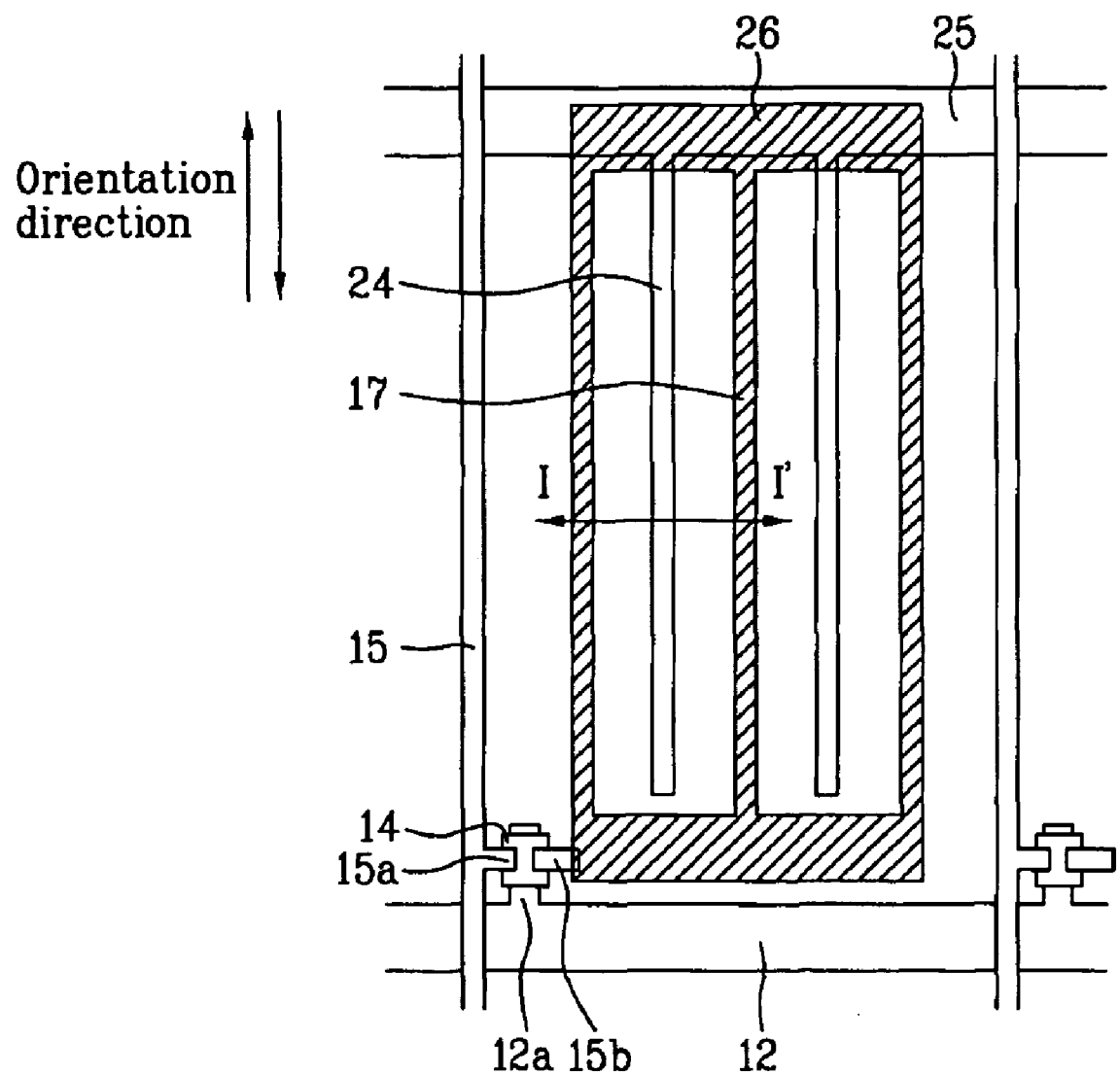
FIG. 1 illustrates a plane view of a related art IPS mode liquid crystal display device.
Figure 2:
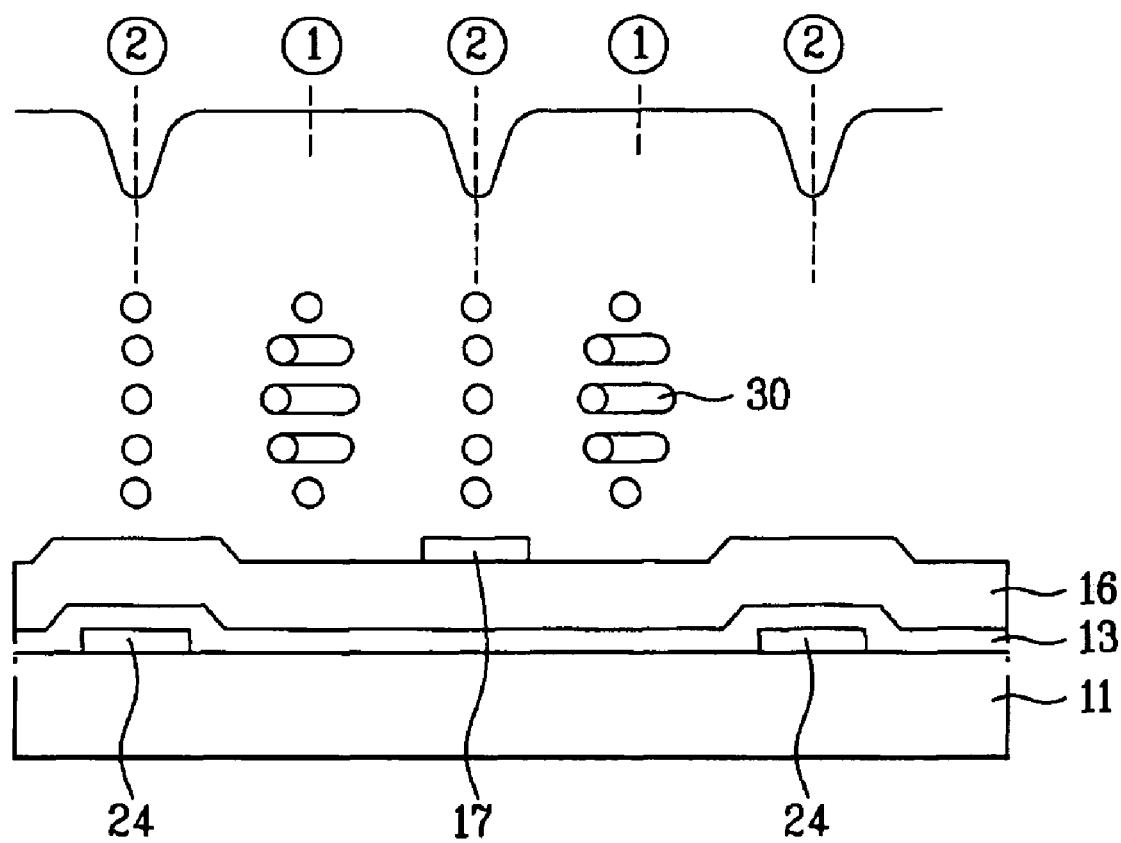
FIG. 2 illustrates a cross-sectional view taken along line I-I' of FIG. 3.
Figure 3:
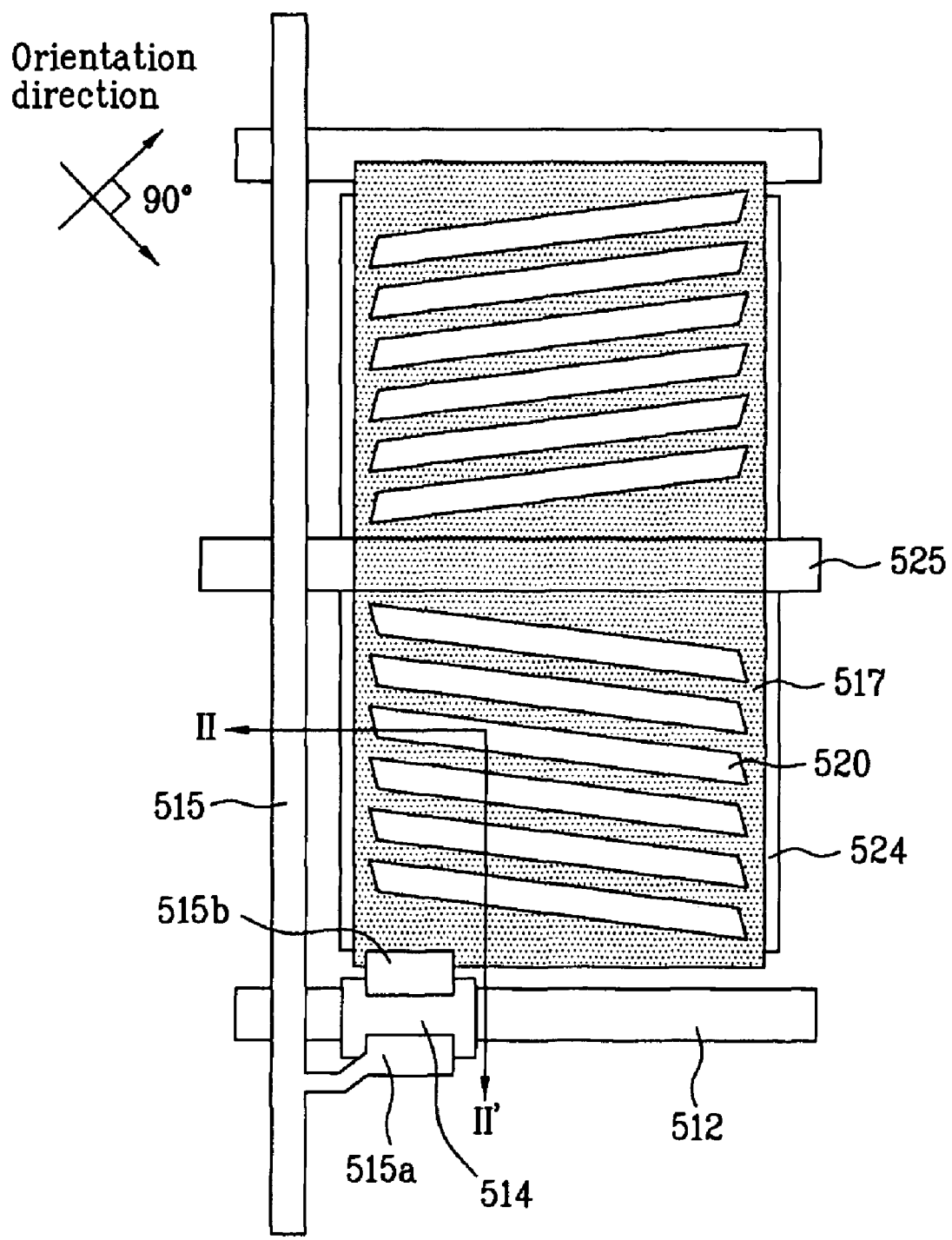
FIG. 3 illustrates a plane view of a related art FFS mode liquid crystal display device.
Figure 4:
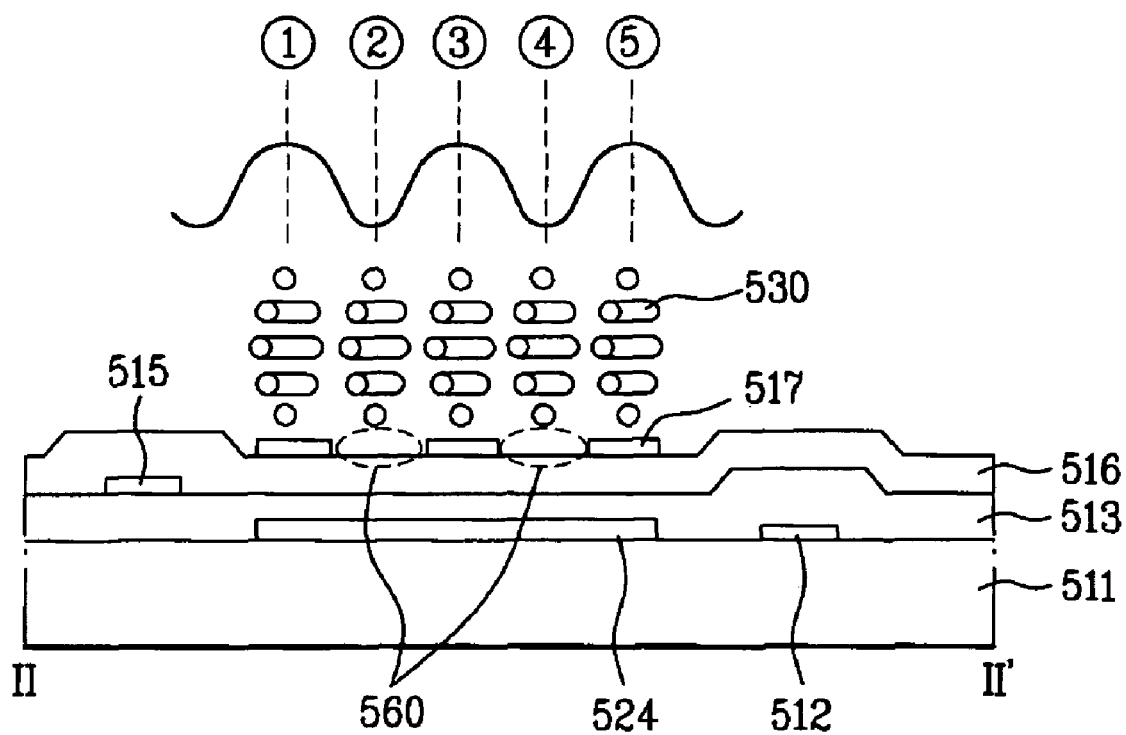
FIG. 4 illustrates a cross-sectional view taken along line II-II' of FIG. 3.
Figure 5:
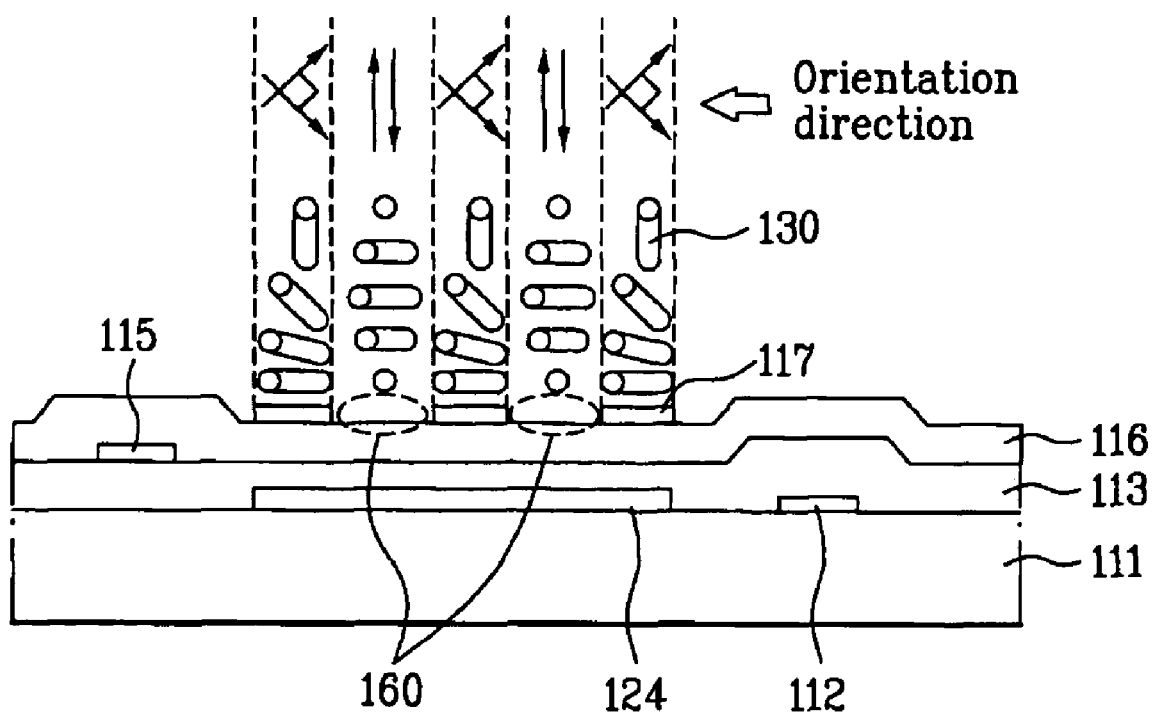
FIG. 5 illustrates a cross-sectional view of a liquid crystal display device according to a first embodiment of the present invention.
Figure 6:
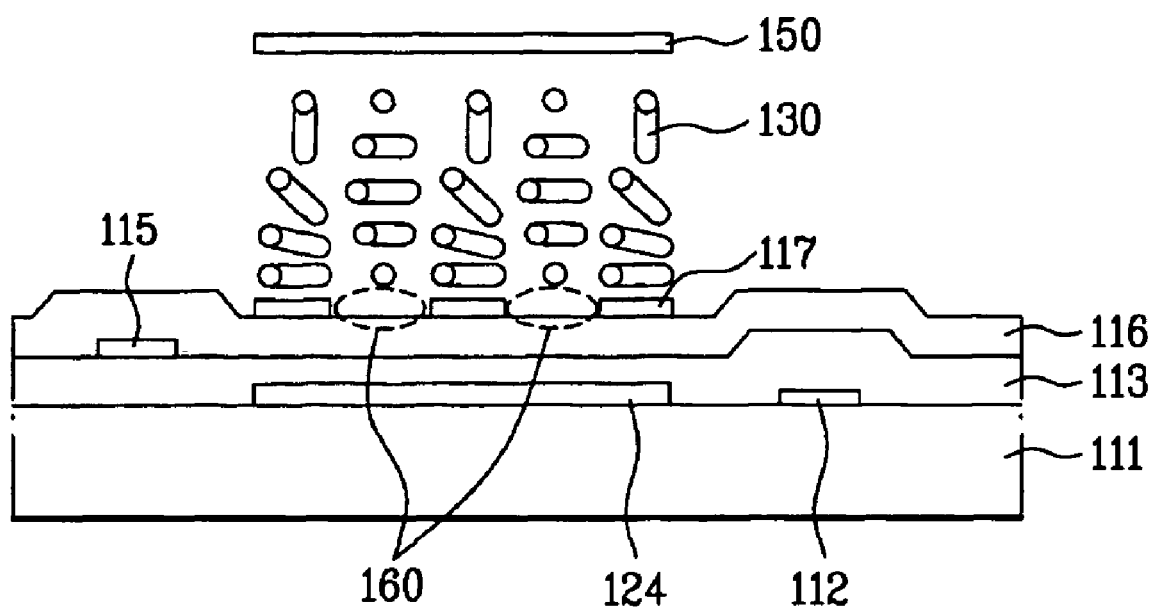
FIG. 6 illustrates a cross-sectional view of a liquid crystal display device according to a second embodiment of the present invention.

FIG. 5 illustrates a cross-sectional view of a liquid crystal display device according to a first embodiment of the present invention. And, FIG. 6 illustrates a cross-sectional view of a liquid crystal display device according to a second embodiment of the present invention.

Referring to FIG. 5, a thin film transistor array substrate of a liquid crystal display device according to the present invention includes a gate line 112 and a data line 115, a common line 125, a counter electrode 124, and a pixel electrode 117. The gate line 112 and the data line 115 cross each other perpendicularly, thereby defining a pixel area, and are insulated from one another by a gate insulating layer 113. The common line 125 is parallel to the gate line 112. The counter electrode 124 contacts the common line 125 and is formed in a plate-form within the pixel. Each pixel electrode 117 is insulated from the counter electrode 124 and has a plurality of slits 160.

The thin film transistor array substrate 111 having the above-described structure is adhered to a counter substrate, which includes a black matrix and a color filter layer. An orientation layer (not shown) is formed between the inner surfaces of the thin film transistor array substrate and the counter substrate, so as to control the initial alignment of the liquid crystal molecules of the liquid crystal layer. The orientation layer is divided into a TN mode area and an IPS mode area. In the TN mode area, the orientation angle twists the liquid crystal molecules by 90°. And, in the IPS mode area, the orientation angle twists the liquid crystal molecules by 180°. More specifically, the surface of the orientation layer above the pixel electrode 117 is treated so that the liquid crystal molecules are twisted by 90°. And, the surface of the orientation layer corresponding to where the slits 160 are formed between the pixel electrodes 117 is treated so that the liquid crystal molecules are twisted by 180°.

Accordingly, when voltage is applied to the pixel electrode 117 and the counter electrode 124, a fringe field is generated between the pixel electrode 117 and the counter electrode 124. Thus, as shown in FIG. 5, the liquid crystal molecules 130 are driven to yield maximum efficiency. In other words, by combining the portion yielding high liquid crystal driving efficiency in the IPS mode with the portion yielding high efficiency in the FFS mode, a maximum driving efficiency can be provided.

The slits 160 of the pixel electrode are formed to be symmetrical to one another along the axis of the common line 125, thereby aligning the liquid crystal directors in directions opposite to one another. Accordingly, a multi-domain may be created. In addition, a thin film transistor is provided at each crossing point between the gate line 112 and the data lines 115, so as to control on/off switching of the voltage. The thin film transistor includes a gate electrode, a gate insulating layer 113, a semiconductor layer, and source/drain electrodes 115a and 115b. The gate electrode is branched from the gate line 112, and the source/drain electrodes 115a and 115b are branched from the data line 115 and formed on the semiconductor layer. The semiconductor layer is formed by serially depositing an amorphous silicon (a-Si) layer and an n+a-Si layer, wherein impurities are ion-injected within the amorphous silicon (a-Si), on the gate insulating layer 113 above the gate electrode.

The method for fabricating the liquid crystal display device according to the present invention will now be described in detail.

First of all, a transparent conductive material, such as ITO or IZO, is deposited on the entire surface of a substrate 111. Then, the layer of transparent conductive material is patterned so that the material remains within the aperture of each pixel, thereby forming the counter electrode 124. Thereafter, a low-resistance metal, such as copper (Cu), aluminum (Al), aluminum alloy (Aluminum Neodymium: AlNd), molybden (Mo), molybden-tungsten (MoW), and so on, is deposited on an entire surface of the structure including the counter electrode 124. Then, the metal layer is patterned so as to form the gate line 112, the gate electrode, and the common line 125. The gate line 112 is parallel to the common line 125, and the counter electrode 124 contacts the common line 125.

Subsequently, an inorganic material, such as silicon oxide (SiOx) or silicon nitride (SiNx), is deposited on the entire surface of the structure including the gate line 112 by using a plasma enhanced chemical vapor deposition (PECVD) method. Accordingly, the gate insulating layer 113 is formed. Then, the semiconductor layer is formed on a portion of the gate insulating layer above the gate electrode. Afterwards, a low-resistance metal, such as copper (Cu), aluminum (Al), aluminum alloy (Aluminum Neodymium: AlNd), molybden (Mo), molybden-tungsten (MoW), and so on, is deposited on an entire surface of the structure including the semiconductor layer. Then, the metal layer is patterned so as to form the data line 115, and the source/drain electrodes. The data line 115 perpendicularly crosses the gate line 112, thereby defining the pixel. And, the source/drain electrodes are formed on the semiconductor layer, thereby completing the thin film transistor.

Thereafter, either an inorganic material (e.g., a silicon nitride material or a silicon oxide material) is deposited or an organic material (e.g., BCB or acrylic resin) is deposited on the entire surface of the structure including the data line 115. Thus, a protective layer 116 is formed. The protective layer 116 is then selectively removed, so as to expose the drain electrode of the thin film transistor, thereby forming a contact hole.

Then, a transparent conductive material such as ITO or IZO is deposited on the entire surface of the structure including the protective layer 116. The layer of transparent conductive material is then patterned, so as to form the pixel electrode having a plurality of slits. Afterwards, a first orientation layer is formed on the entire surface of the structure including the pixel electrode 117. The first orientation layer is formed of one of polyimide, polyamide, and polysiloxane-cinnamate. Thereafter, either the first orientation layer is rubbed by using a printing roll, or light rays are irradiated onto the first orientation layer by using UV irradiation, thereby orienting the first orientation layer.

More specifically, the orientation direction of the first area having the pixel electrode 117 formed thereon and the orientation direction of the second area having the slits formed by removing the pixel electrode 117 are different from each other. The second area is covered with a mask, and the liquid crystals of the second area are oriented in accordance with the first area. And, the first area is covered with a mask, and the liquid crystals of the first area are oriented in accordance with the second area.

Similarly, in a second orientation layer formed on the counter substrate, the orientation direction of the first area having the pixel electrode 117 formed thereon and the orientation direction of the second area having a plurality of slits formed thereon are also different. After covering the second area with a mask, the first area of the second orientation layer is twisted by 90° as opposed to the first area of the first orientation layer. Then, after covering the first area with a mask, the second area of the second orientation layer is twisted by 180° as opposed to the second area of the first orientation layer. At this point, the orientation directions of the first orientation layer and the second orientation layer may be decided without any restriction. Moreover, before forming the second orientation layer on the counter substrate, a black matrix for preventing the leaking of light and R, G, and B color filter layers for representing colors are further included in the structure. Finally, after adhering the two oriented substrates to face into each other, a liquid crystal layer is formed between the substrates, thereby completing the liquid crystal display device.

Referring to FIG. 6, a counter electrode 150 may be additionally formed on the counter substrate. After forming the counter electrode 150, either a Vcom signal or a pixel voltage is applied, thereby generating a vertical electric field between one of the pixel electrode 117 and the counter electrode 124 of the thin film transistor array substrate 111 and the counter electrode 150 of the counter substrate. The vertical electric field formed herein enhances the vertical electric field generated from the liquid crystal display device.

As described above, the liquid crystal display device and the method for fabricating the same according to the present invention have the following advantages.

By orienting the liquid crystals in a manner that the liquid crystals are twisted by 90° in the area above the electrodes and twisted by 180° in the area between the electrodes, the liquid crystals placed above the electrode are driven by the TN mode, and the liquid crystals placed above the area in-between the electrodes are driven by the IPS mode. Thus, the liquid crystal display device can yield a maximum liquid crystal driving efficiency from all areas within the pixel. Accordingly, the overall transmissivity and brightness cam be increased, thereby enhancing the picture quality of the liquid crystal display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
   a gate line and a data line crossing one another on a first substrate, so as to define a pixel;
   a thin film transistor at a crossing-portion of the gate line and the data line;
   a common line being substantially parallel to the gate line;
   a first counter electrode electrically connected to the common line and disposed within the pixel;
   a pixel electrode insulated from the first counter electrode and having a plurality of slits;
   a second substrate facing into and adhered to the first substrate;
   a liquid crystal layer disposed between the first substrate and the second substrate; and
   a first orientation layer formed on the first substrate and a second orientation layer formed on the second substrate, wherein the first and second orientation layers are oriented to be twisted by approximately 90° above the pixel electrode and are oriented to be twisted by approximately 180° above the slit.

2. The device of claim 1, wherein the liquid crystal layer above the pixel electrode is driven by a TN (twisted nematic) mode, and the liquid crystal layer above the slits is driven by an IPS (in-plane switching) mode.

3. The device of claim 1, wherein a fringe field is generated between the first counter electrode and the pixel electrode.

4. The device of claim 1, further comprising a second counter electrode formed on the second substrate.

5. The device of claim 4, wherein an electric field is generated between the second counter electrode and one of the pixel electrode and the first counter electrode.

6. The device of claim 1, wherein the first counter electrode and the pixel electrode are formed of a transparent conductive material.

* * * * *